Nov. 22, 1927. 1,650,449
M. JAEGER
POSITIVE VARIABLE SPEED TRANSMISSION
Filed April 15, 1925 7 Sheets-Sheet 3
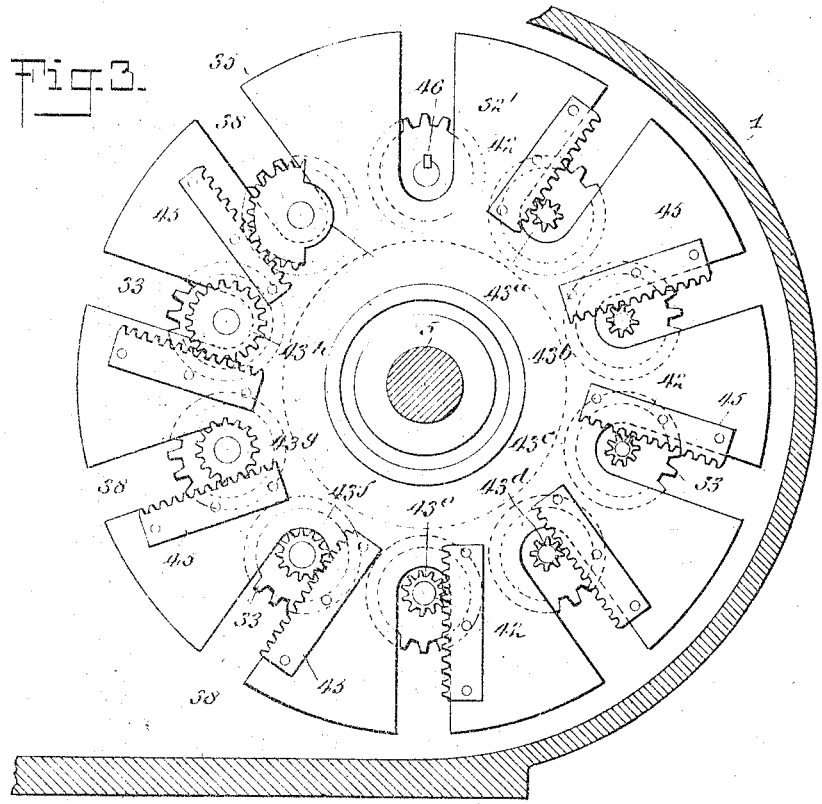
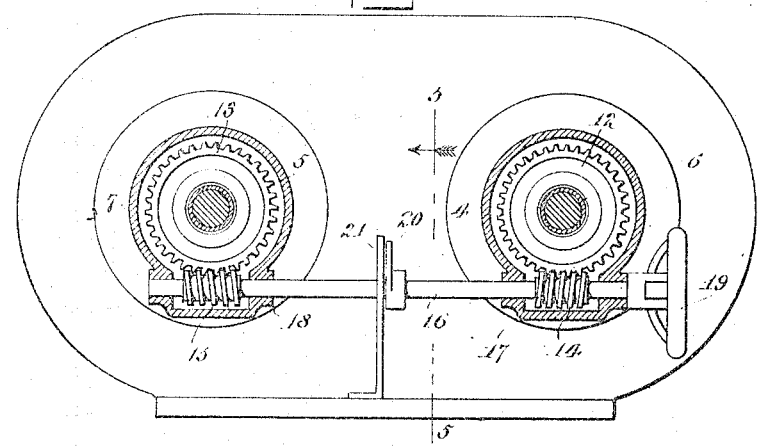
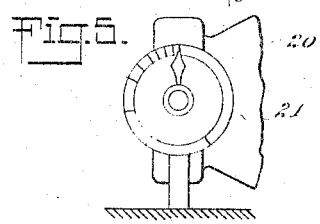
INVENTOR
Max Jaeger
BY
ATTORNEY

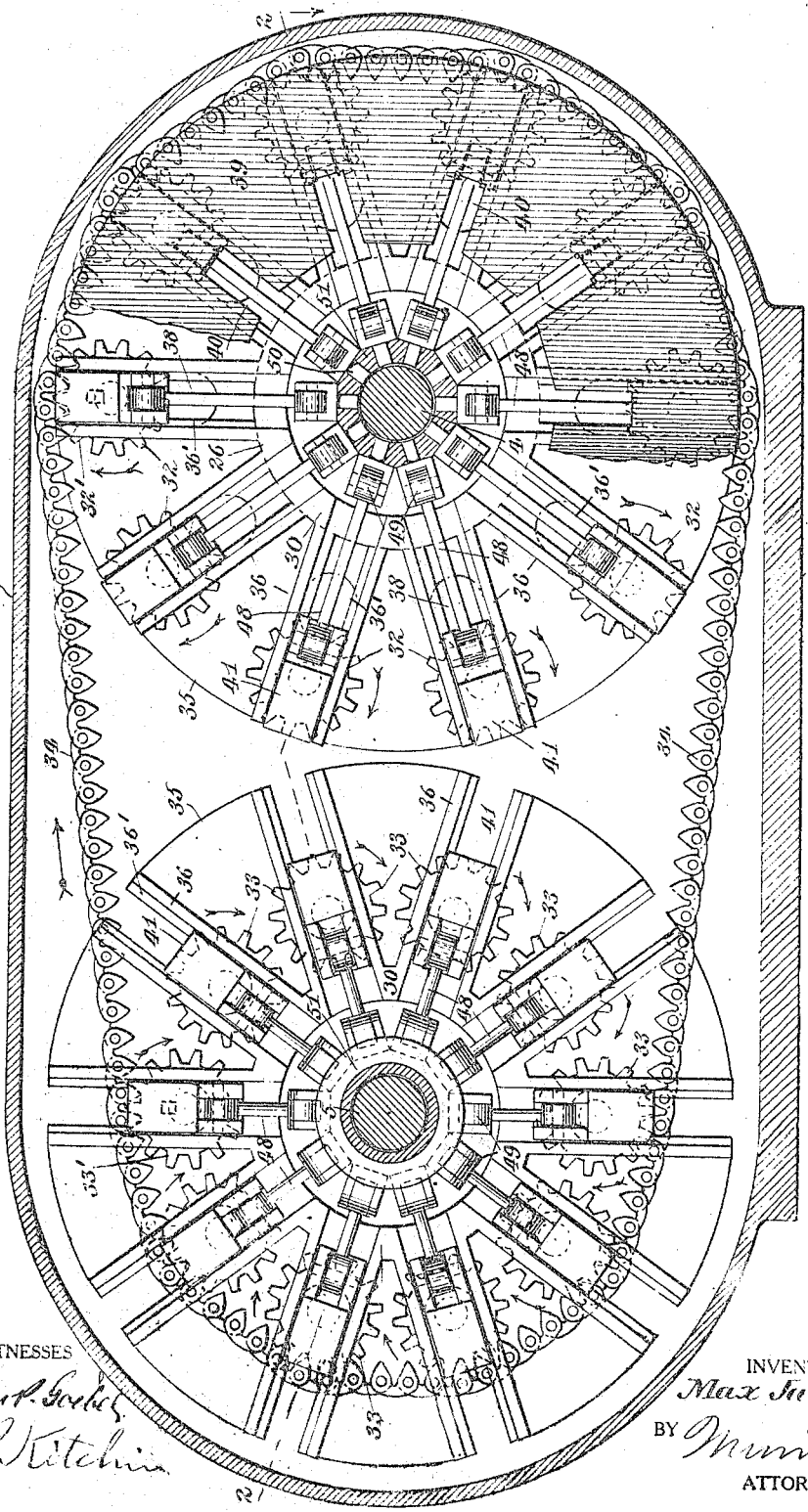

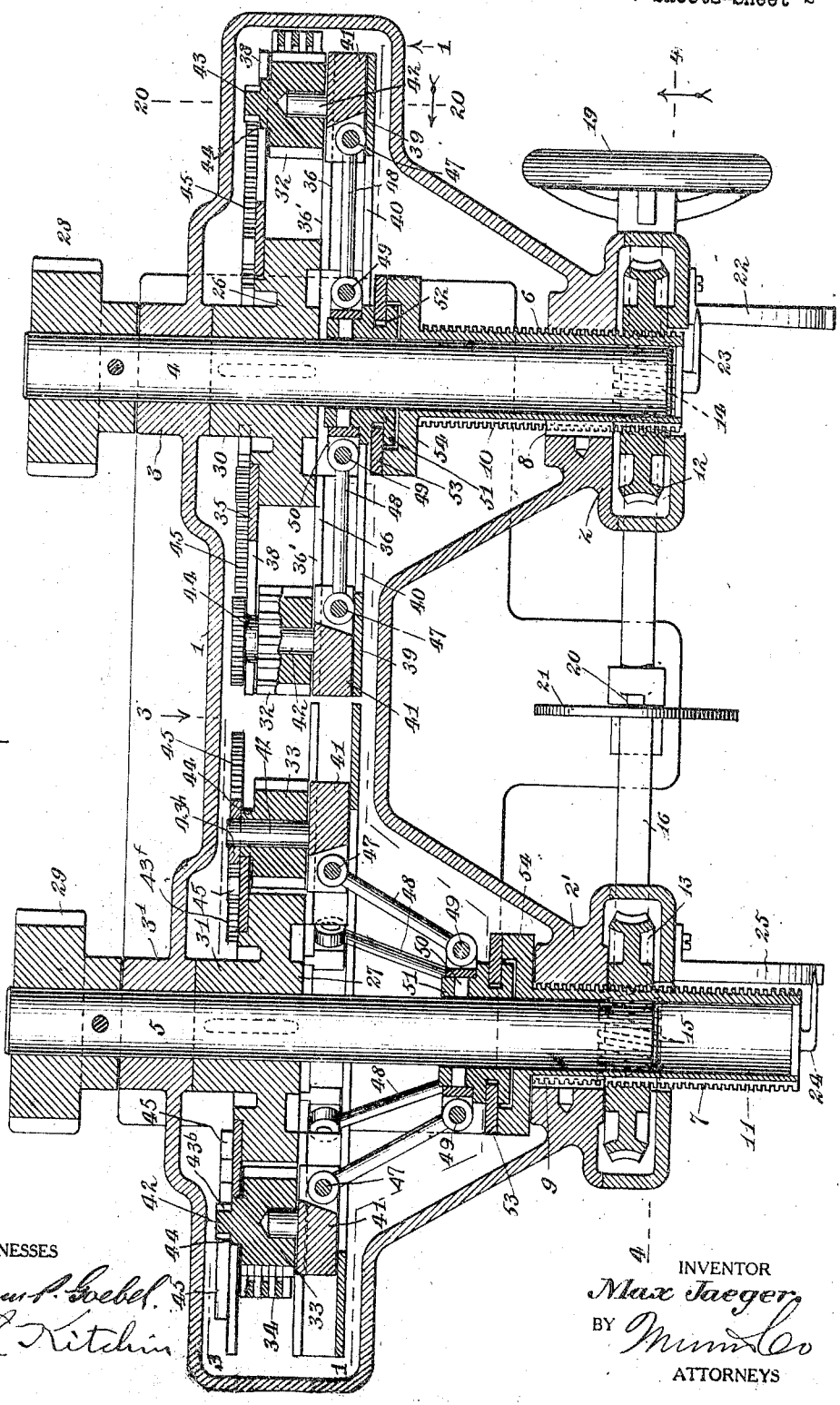

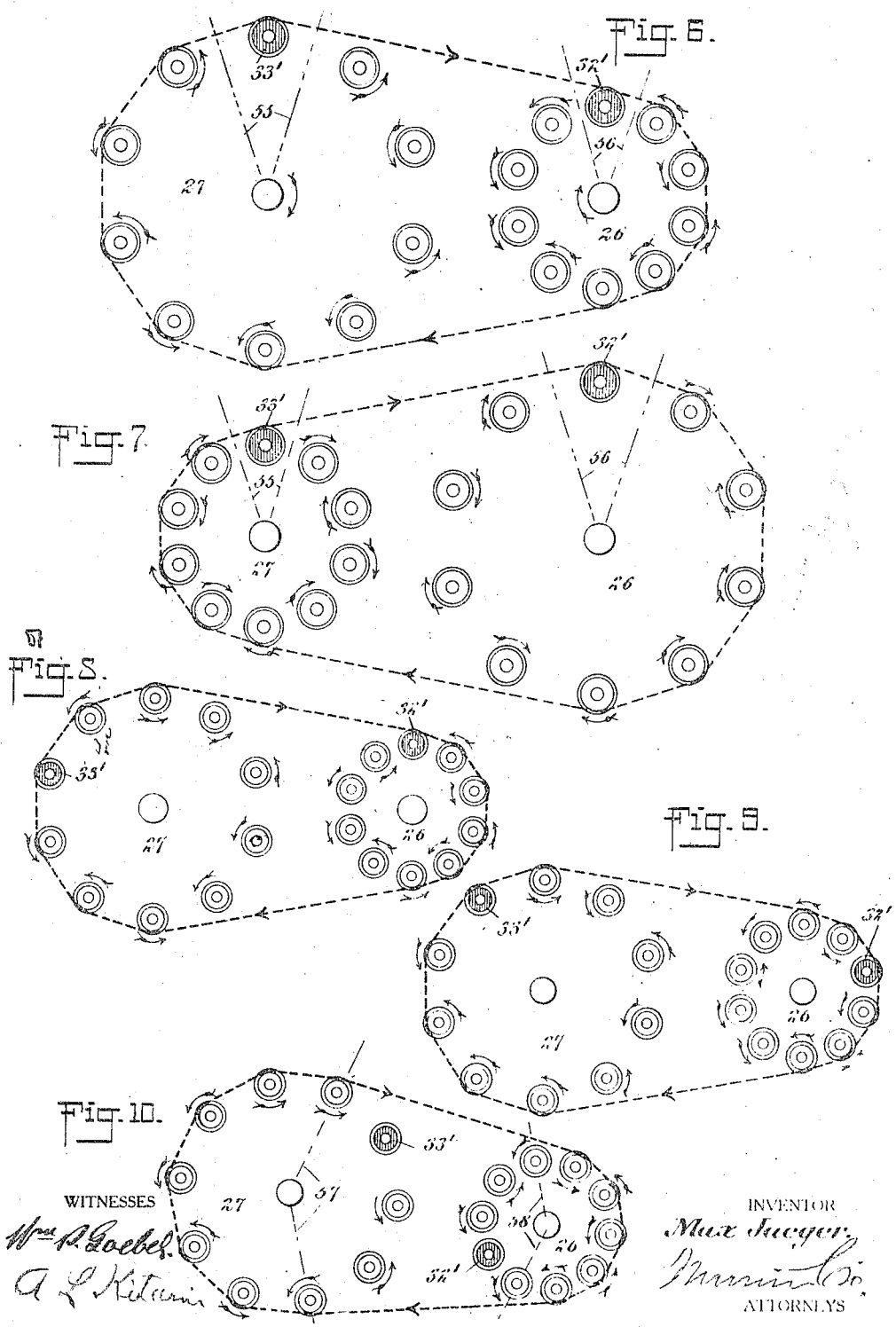

Nov. 22, 1927.
M. JAEGER
1,650,449
POSITIVE VARIABLE SPEED TRANSMISSION
Filed April 15, 1925    7 Sheets-Sheet 5
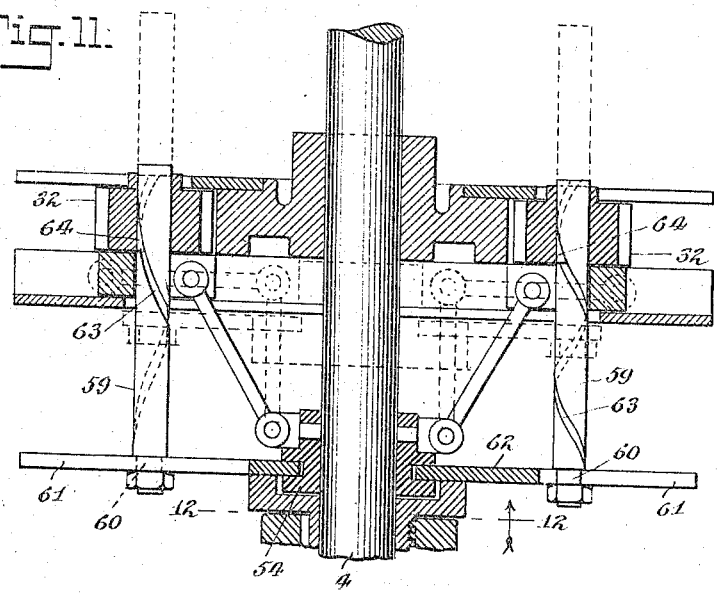
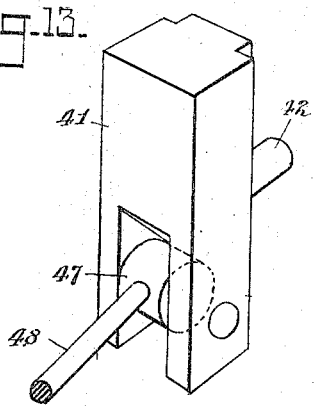
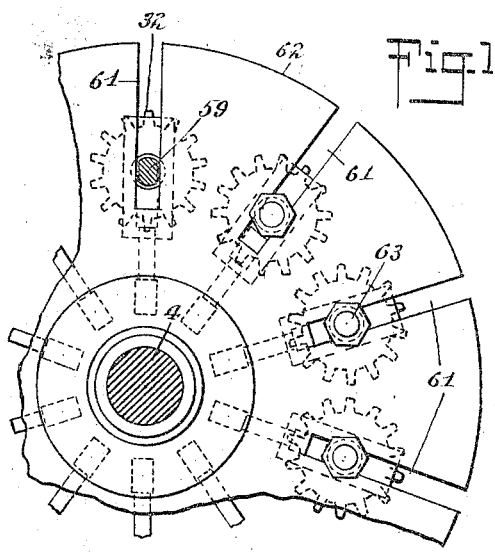
WITNESSES
William P. Goebel
A. L. Ketchin
INVENTOR
Max Jaeger.
BY
ATTORNEYS

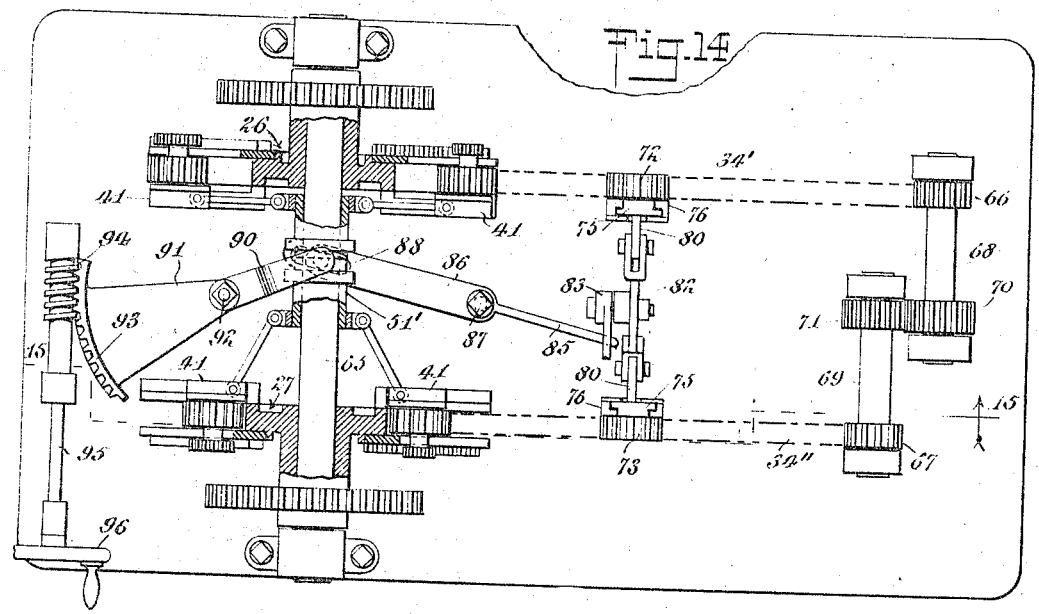
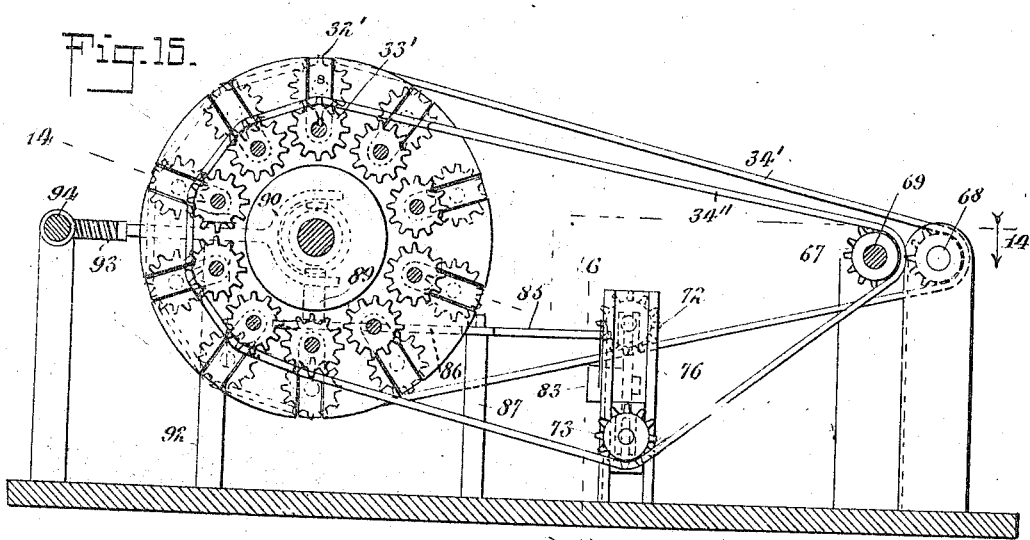
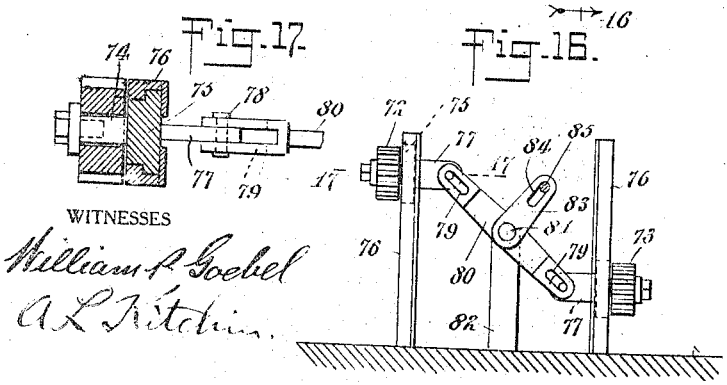

Nov. 22, 1927.

M. JAEGER 1,650,449

POSITIVE VARIABLE SPEED TRANSMISSION

Filed April 15, 1925      7 Sheets-Sheet 7

Patented Nov. 22, 1927.

1,650,449

UNITED STATES PATENT OFFICE.

MAX JAEGER, OF ASTORIA, NEW YORK.

POSITIVE VARIABLE-SPEED TRANSMISSION.

Application filed April 15, 1925. Serial No. 23,315.

This invention relates to power transmission mechanism and particularly to variable speed transmission mechanism having as one of its objects to obtain a positive variable speed transmission of power.

Another object of the invention is to provide a power transmission wherein there will be a positive drive during the variation of speed.

Another object, more specifically, is to provide a device wherein a continuous speed variation between two extremes is provided while keeping the constant speed shaft and the variable speed shaft always positively connected while one drives the other.

A still further object of the invention is to provide a variable speed transmission which may be built in a compact form and which will eliminate all friction transmission of power.

In the accompanying drawings—

Figure 1 is a longitudinal sectional view through Figure 2 on line 1—1, the same disclosing the working parts of one embodiment of the invention.

Figure 2 is a horizontal sectional view through Figure 1 on line 2—2.

Figure 3 is a fragmentary sectional view through Figure 2 on line 3—3.

Figure 4 is a sectional view through Figure 2 on line 4—4, the same being on a reduced scale.

Figure 5 is a detail fragmentary sectional view through Figure 4 on line 5—5.

Figure 6 is a diagram of the structure shown in Figures 1 and 2 illustrating how the parts may be adjusted to one extreme position.

Figure 7 is a view similar to Figure 6 but showing the parts adjusted to the opposite extreme position.

Figure 8 is a view similar to Figure 6 but showing the parts in a different position though with the same adjustment.

Figure 9 is a view similar to Figure 8 but showing the parts advanced slightly.

Figure 10 is a view similar to Figure 8 but showing the parts in position whereby the relative driving and driven elements may be adjusted to change the ratio of transmission.

Figure 11 is a sectional view similar to part of Figure 2 but showing a modified construction illustrating an embodiment of the invention which may be more practical than that shown in Figure 2.

Figure 12 is a fragmentary sectional view through Figure 11 on line 12—12.

Figure 13 is an enlarged detail perspective view of one of the gear wheel carrying blocks.

Figure 14 is a horizontal sectional view with certain parts in elevation illustrating another embodiment of the invention to that shown in Figures 1 and 11, the same being taken approximately on line 14—14 of Figure 15.

Figure 15 is a sectional view through Figure 14 on line 15—15.

Figure 16 is a fragmentary sectional view through Figure 15 on line 16—16.

Figure 17 is a detail fragmentary sectional view through Figure 16, approximately on line 17—17.

Figure 18:
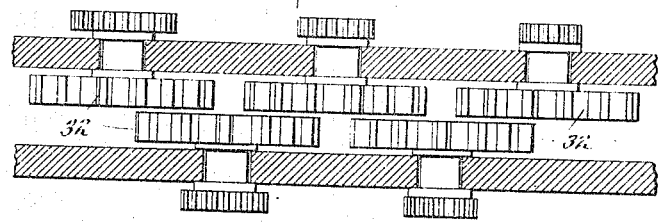
Figure 18 is a detail fragmentary view in diagram showing how a plurality of gears may be used.
Figure 19:
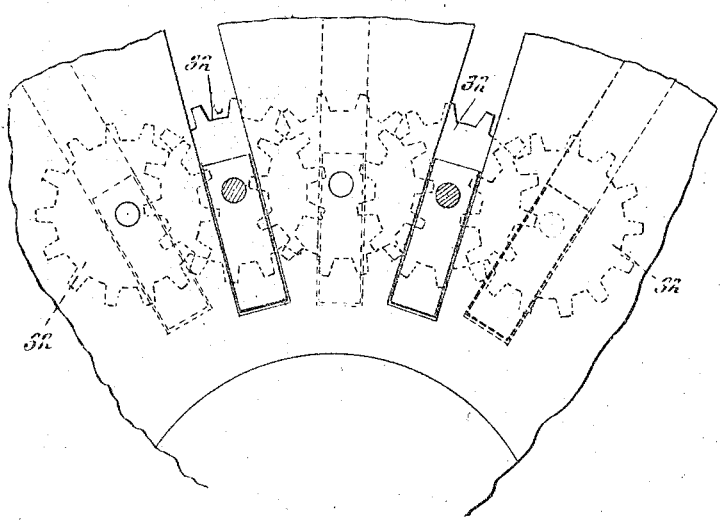
Figure 19 is a side view in diagram of the structure shown in Figure 18.

Referring to the accompanying drawings by numerals, 1 indicates a casing in which most of the parts of the device are mounted. The casing 1 is provided with journal boxes 2, 2', 3 and 3'. The journal boxes 3 and 3' accommodate the driving shaft 4 and the driven shaft 5 respectively while the box 2 accommodates the threaded sleeve 6 which is slidingly mounted therein and box 2' accommodates a sleeve 7 slidingly mounted therein. The sleeves 6 and 7 are held against rotation by keys 8 and 9 operating in grooves 10 and 11. A worm wheel 12 is threaded onto sleeve 6 and worm wheel 13 is threaded onto sleeve 7, said worm wheels meshing continually with the worms 14 and 15 (Figure 4) which worms are rigidly secured to a shaft 16 supported in suitable bearing boxes 17 and 18 forming part of the casing 1. A hand wheel 19 is connected to shaft 16 near one end and at a convenient point between the ends a pointer 20 is connected to shaft 16, said pointer being adapted to move over a dial 21 for indicating the degree of rotation of shaft 16. Associated with the sleeve 6 is a variable scale 22 rigidly secured to part of the casing 1, said scale co-acting with the pointer 23 rigidly secured in any desired manner to sleeve 6. In respect to the sleeve 7 a pointer 24 is connected thereto coacting with a variable scale 25 rigidly secured to casing 1 in any desired manner. These scales and pointers act to show the relative position not only of the sleeves 6 and 7 but the relative diameters of what may be termed the driving wheel 26 and the driven wheel 27.

The driving shaft 4 may be connected to a source of power in any suitable manner, as for instance, through the gear wheel 28, while shaft 5 may be connected to any suitable machinery to be driven by gear wheel 29. As indicated in Figures 1 and 2, a certain specific structure has been shown for the variable transmission of power with a positive drive while in Figures 11 and 14 modified structures of the same idea are shown. It is to be understood that other forms of the inventive idea may be used without departing from the spirit of the invention as long as a positive connection is maintained between the driven and driving members and a variable adjustment also provided. The shaft 4 is keyed or otherwise rigidly secured to the hub 30 of wheel 26 while shaft 5 is keyed or otherwise rigidly secured to the hub 31 of wheel 27. Arranged on the wheel 26 are a number of small gear wheels 32 and arranged on the wheel 27 are a number of similar small gear wheels 33. An endless chain 34 is fitted onto the respective wheels 26 and 27 as shown in Figure 1, said chain being of the well known silent type with a proper pitch to properly engage the teeth of gears 32 and 33, which teeth are also properly pitched to receive the chain 34. Means have been provided as will hereinafter be described for moving the gears 32 and 33 radially on each of the wheels 26 and 27 and, consequently, the pitched diameter of these wheels will vary but the pitched diameter of the respective gears 32 and 33 will not vary whereby the chain 34 will properly fit the same and produce the desired driving connection. As the wheels 26 and 27 are of identical construction, the description of one will apply to both.

Figure 20:
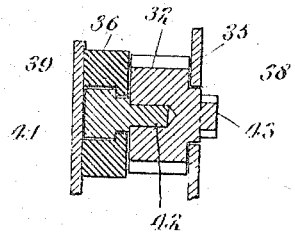
Figure 20 is a detail fragmentary sectional view through Figure 2 on line 20—20.

As indicated in Figures 1, 2 and 3, the wheel 26 is provided with a side plate 35 which is secured in place by screws or in any other desired manner. On the opposite side of the wheel 26 to plate 35 are a plurality of radially extending guides 36 which are preferably cast integral with the hub 30 as shown in the drawing. The plate 35 is provided with a radial slot 38 for each of the guides 36, said slots being in line therewith. Mounted on the guides 36 in any desired manner, as for instance, by being screwed thereto, is a plate 39 provided with a short slot 40 for each of the slots 38 as illustrated in Figure 1. The plate 39, therefore, overhangs the respective sliding blocks 41 which blocks are provided with pins or shafts 42 either extending into the respective gear wheels 32 as shown at the right in Figure 2, or entirely therethrough as shown at the left in Figure 2. Where the pinion 43 is small as shown at the right in Figure 2 and also shown in Figure 20, it is preferably made integral with pinion gear 32 and the pin or shaft 42 is cut short while the pin extends entirely through the gear 32 when the gear 43 is large as shown at the left in Figure 2. A neck or extension 44 connects gear 32 with pinion 43, said neck or extension rotatably fitting in the slots 38. The various pinions 43 continually mesh with racks 45 as shown in Figure 3. As shown in this figure, one of the pinions, namely, pinion 43¹, is made as a segment because the same is of such large diameter. The various racks 45 are riveted or otherwise rigidly secured to plate 35 so that when the various blocks 41 and their various gears 32 move outwardly or inwardly there will be a rotary motion transmitted to the gears 32 in proportion to the radial movement.

As indicated in Figure 3, there are shown ten gear wheels 32 but it is evident that a greater or less number might be used without departing from the spirit of the invention. Also, in this figure, it will be noted that the gear wheel 32′ is secured by a key 46 to the shaft or pin 42 whereby it cannot rotate except with the entire driving wheel 26. In order to better describe the operation, the various pinions 43 have been indicated by letters in Figure 3 and designated as 43ª, 43ᵇ, 43ᶜ, 43ᵈ, 43ᵉ, 43ᶠ, 43ᵍ, 43ʰ, and 43ⁱ, which letters are also followed in the diagrams shown in Figures 6 to 10 inclusive. Each of the gear wheels 32 is carried by a sliding block 41 and each sliding block is provided with a bifurcated portion at the lower end for accommodating the pivotal pin 47, which pivotally connects the rod 48 with the block, which rod is pivotally connected by a pin 49 to a forked member 50 which is connected or secured to the sleeve 51 in any desired manner. The sleeve 51 is slidably mounted on the shaft 4 and is provided with an annular groove 52 accommodating the annular split plate 53, which plate is rigidly secured to the enlargement 54 of sleeve 6 whereby whenever sleeve 6 is reciprocated, sleeve 51 will also be reciprocated and as this is done the various rods 48 will be either pulled or pushed for causing the various blocks 41 to move radially inwardly or outwardly.

As shown in Figure 2, all of the blocks 41 on the driving wheel 26 have been moved outwardly to their extreme outer position while the similar blocks on the driven wheel 27 are all moved inwardly to their inner extreme position so that the effective periphery of wheel 27 is at a minimum point while the effective periphery of the driving wheel 26 is at a maximum point and, therefore, the driven shaft 5 will be driven at a maximum speed. By rotating the hand wheel 19, the sleeve 6 may be moved outwardly and at the same time sleeve 7 moved inwardly so that the condition of the driving and driven wheels will gradually become reversed if hand wheel 19 is moved until sleeve 6 is at its outermost position. In order to secure this action, sleeve 6 is preferably provided with a right hand thread and sleeve 7 is preferably provided with a left hand thread though the reverse could be true without changing the invention. It will be noted that the hand wheel 19 may be moved a fraction of a revolution or as many revolutions as desired and, consequently, the effective periphery of the wheels 26 and 27 may be changed very slightly or changed appreciably. Ordinarily, the driving shaft 4 is rotated at a constant speed and if it should be desired to decrease the speed of shaft 5 slightly, the movement of the hand wheel 19 would be very small but if it should be desired that the shaft 5 rotate at the same speed as shaft 4, hand wheel 19 will be given several revolutions or until the effective periphery of the wheels 26 and 27 is the same, that is, both wheels would have the same diameter. It will be noted that as one wheel increases in diameter the other decreases and, consequently, as one wheel requires more of the chain 34 the other gives up or relinquishes some of the chain and, consequently, the chain will always remain in proper operative position regardless of the respective diameters of the respective wheels so that there will be always a positive connection between the driving and driven shafts and, therefore, there will be a positive drive at all times regardless of the speed of the parts.

In increasing and decreasing the diameter of the respective wheels, the distance apart of the respective gear wheels 32 will vary sometimes a small part of a link of chain 34 and other times a distance equal to one or more links. As the chain cannot stretch it is, therefore, necessary to make provision for adjusting the relative position of the various gear wheels 32 to compensate for the distance between the gear wheels as they are moved inwardly or outwardly. In Figure 3, a compensating mechanism is shown which consists of the various racks 45 meshing with the various pinions 43. If the various pins or shafts 42 are moved radially outwardly from the position shown in Figure 3 until the distance between the respective gears 32 has been increased the distance of one of the links of chain 34, a corresponding compensation must be made. As the gear wheel 32' (Figure 3) cannot rotate, it merely moves outwardly radially and as pinion 43ª moves outwardly radially, it will rotate partially and will thereby partially rotate the gear wheel 32 connected therewith, said rotation being exactly sufficient to compensate for the distance of one link of chain 34. At the same time that this takes place, pinion 43ᵇ will rotate its gear 32 so as to compensate for the distance of two links. This distance may be termed one unit of movement of the various gears 32 and, consequently, it will be noted that all of the gear wheels 32 must rotate one unit additional from pinion 43ª to pinion 43ⁱ. Pinion 43ª will move one unit, pinion 43ᵇ will move two units and so on around to pinion 43ⁱ which will rotate nine units. One unit has been described as a distance of one link but it is evident that if the wheels 32 are moved radially for a distance to separate the same for more than a distance of a link or less than the distance of a link, then the unit of rotation will be correspondingly greater or less. Under some circumstances, the unit of rotation may be a very small fraction of a distance of a link but each of the gears will rotate their proper distance as described. As the gear wheels connected with pinions 43ᶠ, 43ᵍ, 43ʰ and 43ⁱ are not in mesh with chain 34, the rotation of these will be idle but they are rotated to keep their proper relationship during adjustment. In regard to the gear wheels 33 of the driven wheel 37, it will be, of course, evident that the action therein will be a reverse as just described as these gear wheels will move toward the center of the wheel in proportion to the outward movement of the gear wheels 32.

In Figure 6, a diagram is presented which shows the relative position of the various gear wheels and how they rotate when being shifted. If the device is standing still and the parts are in the position shown in Figure 6, the driving wheel 26 may be enlarged to any extent up to its full limit and the driving wheel 27 may be reduced to its full extent as shown in Figure 7. It will be noted that the stationary gears 32' and 33' are located between the respective diverging lines 55 and 56 and that while located in this manner any desired adjustment may be secured. However, if the respective wheels 26 and 27 are rotated until the parts assume the position shown in Figure 8, no adjustment can be made as a proper compensation would not be provided on both sides of the gear wheel 33' though the gear wheel 32' is still in condition to permit adjustment. When the parts are again moved until they assume the position shown in Figure 9, both of the stationary gear wheels 32' and 33' are positioned so that an adjustment cannot be secured. However, when the parts assume the position shown in Figure 10, any desired adjustment may be secured while gear wheel 33' is positioned between the lines 57 and gear wheel 32' is between the lines 58. If the wheels are rotating and an adjustment is attempted when the parts are in the position shown in Figure 6, a slight adjustment will be made as the parts will move radially and the compensating mechanism will properly function until one of the wheels 32' or 33' moves out of the angle provided by the respective lines 55 and 56. If the parts are running before another adjustment can be made, the parts must again assume the position shown in Figure 6 or substantially the position shown in Figure 10. As the driving shaft is usually driven several hundred revolutions a minute, the parts will assume both the position shown in Figure 6 and that in Figure 10 quite often and, consequently, adjustment may be readily made while the device is running and the driven shaft caused to gradually increase or decrease in speed to suit the requirements.

In Figures 11 and 12 will be seen a modified form of the invention which utilizes the same principle as shown in Figures 1 and 2 but probably presents a more practical structure. In this form of the invention, instead of having the compensating mechanism formed as shown in Figure 3, namely, with the racks 45 and associated parts, a shaft 59 is provided for each of the gear wheels 32, said shaft having a reduced flattened extension 60 slidingly fitted into the grooves 61 of plate 62, which plate is carried by the sleeve 51. Each of the shafts 59 is provided with a spiral groove 63 accommodating a spiral thread or bead 64 extending into the bore of wheel 32. It will be understood that each of the spirals 63 will have a different pitch so that upon the movement of the disk 62 a given distance, each of the gear wheels 32 will rotate a different distance or different unit of rotation as heretofore described, namely, one unit rotation of the gear wheel next to the stationary gear 32', two units for the next gear wheel and so on for the remaining gear wheels. It will be, of course, understood that as the blocks 41 and the various gear wheels 32 move outwardly or inwardly radially, the neck 60 will slide in the slot 61 but by reason of the flattened portions of the neck, the respective shafts 59 cannot rotate.

In Figures 14 to 17 inclusive, another embodiment of the invention is shown wherein the structure is such that the respective stationary gears 32' and 33' will come opposite each other or within the angles provided by the lines 55 and 56 upon each rotation or less than a rotation. In order to accomplish this, a driving wheel 26 is arranged in line with the driven wheel 27 and mounted upon a stationary shaft 65. The chain 34' runs over the driving wheel 26 and over a small gear wheel 66 while a chain 34" runs over the driven wheel 27 and a small gear wheel 67. The gear wheels 66 and 67 are connected respectively to the shafts 68 and 69 and said shafts carry meshing gears 70 and 71 respectively whereby wheel 27 will be rotated in a reverse direction to wheel 26. If it should be desired that they operate in the same direction, gear wheels 70 and 71 could be eliminated and the shafts 68 and 69 directly connected. The wheels 26 and 27 are made identical with the showing in Figures 1 and 2 except that they are both free to rotate on the same shaft 65. As the respective wheels 26 and 27 are increased and decreased in diameter, there will be provided slack in the chains 34' and 34". To accommodate or compensate for this slack, pinions 72 and 73 are provided and maintained in continuous mesh with the chains 34' and 34". Each of these pinions is carried by a shaft 74 (Figure 17) which is rigidly secured to the sliding block 75, said block being slidingly mounted in a guiding standard 76. An extension 77 projects from block 75 and carries a pin 78 which extends through a suitable slot 79 in the lever 80. The structure just described is true in respect to both of the wheels 72 and 73 but the parts are so arranged that the gear wheel 72 will be up when the gear wheel 73 is down. A journal member 81 rockably supports the member 80 on a suitable support 82. An arm 83 is rigidly secured to the journal member 81 which in turn is rigidly secured to member 80. The arm 83 is provided with a slot 84, which slot accommodates the reduced extension 85 of the arm 86. The arm 86 is supported by a vertical support 87 which supports the arm 86 in such a manner as to allow it to freely swing in a horizontal plane. The end opposite the reduced extension 85 is formed with a slot 88 which accommodates the pin 89 extending from one end of the bifurcated arm 90 of the lever 91, which lever is supported on a vertical standard 92 whereby it may swing in a horizontal plane. The end of arm 91 opposite the bifurcated arm 90 carries a segmental rack 93 which continually meshes with a worm 94 carried by shaft 95. When the hand wheel 96 is operated, the various parts are caused to function so that arm 91 will swing and move the divided sleeve 51' for causing the various blocks 41 to be moved outwardly or inwardly radially on the respective wheels 26 and 27 and at the same time swing the arm 86 so as to shift the pinions 72 and 73 upwardly or downwardly in a proper proportion to compensate for the slack of either of the chains as shown in Figure 15. By reason of this construction and arrangement, the stationary gears 32' and 33' are brought opposite each other upon each revolution or on less than a revolution of one of the wheels and, consequently, there will be a short period when these wheels are in line when an adjustment may be secured to vary the diameter of the respective wheels.

Under some circumstances it may be desirable to use a plurality of rows of gear wheels 32, as for instance, the two rows illustrated particularly in Figure 18. It will be noted that the various gear wheels accommodate a single chain and that one set of wheels 32 is arranged in the space between the other whereby the polygon effect or position of the chain is reduced to a minimum as the same passes around the driving wheel 26, while, therefore, a greater ratio can be effected. The sleeve 51' is divided so that the respective parts may independently rotate but must slide longitudinally of shaft 65 simultaneously.

By the various constructions submitted, several different embodiments of the invention have been shown all illustrating the variable speed transmission which always maintains what is commonly known as a continuous drive even while the speed ratio is being changed. As heretofore described, the driving element may be gradually reduced in effective diameter while the driven element is gradually increased in effective diameter and while this is taking place the chain will continue to transmit power from one to the other and thereby produce a continuous drive even during the adjustment of the parts. As the parts are adjusted, the speed variation will be continuous in the ordinary accepted sense, though if analyzed exactly, it would be found that there is a step by step increase and decrease which is so small that for practical purposes it is continuous. In this sense, a continuous speed variation is possible and at the same time a positive drive is provided.

What I claim is:—

1. A positive variable speed transmission device, comprising a driving element, a driven element, each element being formed with a plurality of toothed wheels, a chain fitting over said toothed wheels for connecting said driving and driven elements so that power will be transmitted from one to the other, and manually actuated means for adjusting said driving and driven elements whereby the speed of the driven element will be varied said manually actuated means including a gear for each toothed wheel, said gears being of different sizes and a stationary rack continually meshing with said gears, said adjusting means and parts associated therewith functioning without disconnecting the chain from said toothed wheels, and means acting to lock said toothed wheels against independent rotation except when said manually actuated means is functioning.

2. A speed transmission device, comprising a casing, a toothed driving member mounted in said casing, a toothed driven member mounted in said casing, a shaft extending into the casing for driving said driving member, a shaft extending from said casing and connected with said driven member for transmitting power therefrom, a chain for operatively connecting said driving and driven members so that the driving member will move the driven member, means for expanding and contracting said toothed members, and means for differentially shifting the position of the respective teeth of the toothed members as said members are expanded and contracted whereby said chain will always properly engage the teeth of said members.

3. A variable speed transmission device, comprising a driving element formed with a plurality of toothed wheels, a driven element formed with a plurality of toothed wheels, an endless chain fitted onto said wheels for transmitting power from the driving element to the driven element, means for varying the diameter of said wheels so as to vary the ratio of drive therebetween, and compensating means for compensating for the change in the pitched diameter of said wheels, said compensating means including a gear member rigidly secured to each of said toothed wheels and rotatable therewith said gear members being of different sizes, and a relatively stationary rack continually meshing with each of said gear members.

4. A variable speed transmission device, comprising a driving element including a wheel provided with a plurality of independent gears, a driven element including a wheel provided with a plurality of independent gears, an endless chain fitted onto said wheels and running over the gears of the respective wheels, manually actuated means for moving the gears on one wheel radially outwardly and moving the gears on the other wheel radially inwardly for changing the speed ratio without affecting the action of said chain, said manually actuated means including a gear member rigidly secured to each of said toothed wheels and rotatable therewith, said gear wheels being of different sizes, and a radially extending relatively stationary rack continually meshing with each of said gear members.

5. A variable speed transmission device, comprising a driving element and a driven element, each of said elements being provided with a plurality of independent gears mounted thereon, means for moving the gears on each element radially, a chain mounted to travel over the gears of the respective elements so as to transmit power from one element to the other, and means for rotating independently in either direction said gears on each of said elements when the gears are moved radially so as to compensate for the change in pitched diameter of the respective elements, said means including a toothed member of a different size secured to each of said gears and a relative stationary rack meshing with each of said toothed members.

6. A variable speed transmission, comprising a driving element and a driven element, each of said elements being provided with a plurality of radially movable blocks, manually actuated means for moving said blocks outwardly or inwardly on each of said elements, a gear wheel rotatably mounted on each of said blocks, means for preventing each of said gear wheels from rotating independently except when moved radially, an endless chain mounted on said driving and driven elements and interlocking with said gears as said elements rotate, and means for causing the desired rotation of each of said gears independently as the gears are moved radially to compensate for the distance between the respective gears and thereby cause the chain to always substantially accurately fit the gears as the effective diameters of the respective driving and driven elements are changed, said last mentioned means including a toothed member rigidly secured to each of said gear wheels, said toothed members being of different sizes and a relatively stationary rack meshing with each of said toothed members whereby as said blocks are moved radially the toothed members will cause the gear wheels to be rotated at different distances to properly compensate for the change in distance between the gear wheels.

7. A variable speed transmission device, comprising a driving element and a driven element, each of said elements being provided with a plurality of radially movable gears, said gears being always maintained in a circle, a rod associated with each of said gears, a sliding sleeve for each of said elements, said sleeves being connected to one end of the respective rods of the respective elements, manually actuated means for moving said sleeves so that said rods will cause the gear wheels to move radially inwardly and outwardly, an endless chain mounted on said gear wheels to transmit power from the driving element to the driven element, and means for preventing independent rotation of said gears except when they are moved radially, said means acting to independently rotate the gears in the proper proportion to compensate for the difference in distance between the respective gears and thereby cause said chain to always function properly, said last mentioned means including a toothed member rigidly secured to each of said gear wheels, said toothed members being of different sizes and a relatively stationary rack meshing with each of said toothed members whereby as said blocks are moved radially the toothed members will cause the gear wheels to be rotated at different distances to properly compensate for the change in distance between the gear wheels.

8. A variable speed transmission device, comprising a driving element, a driven element, an endless chain mounted on said elements for transmitting power from one element to the other, each of said elements being provided with a plurality of gear wheels arranged in a circle, said chains being mounted to operate on said gear wheels, means for moving said gear wheels radially, means acting as a pinion connected with each of said gear wheels, and a rack stationary in respect to the gear wheels continually meshing with said pinions, said pinions being of different sizes to cause a proper rotation of the gear wheels as they are moved outwardly and inwardly whereby the distance between the respective gear wheels will be compensated in respect to the chain to cause the chain to properly fit the teeth of the gear wheels.

MAX JAEGER.